United States Patent [19]
Schneyderberg Van Der Zon

[11] Patent Number: 4,996,645
[45] Date of Patent: Feb. 26, 1991

[54] VEHICLE NAVIGATION DEVICE WITH REPRODUCTION OF A SELECTED MAP ELEMENT ACCORDING TO A PREDETERMINED REPRESENTATION STANDARD

[75] Inventor: Ingrid A. C. Schneyderberg Van Der Zon, Eindhoven, Netherlands

[73] Assignee: U.S. Philips Corporation, New York, N.Y.

[21] Appl. No.: 239,890

[22] Filed: Sep. 2, 1988

[30] Foreign Application Priority Data

Sep. 4, 1987 [NL] Netherlands .................. 8702087

[51] Int. Cl.[5] .................................... G08G 1/0969
[52] U.S. Cl. ...................... 364/449; 340/995; 364/424.01; 364/424.02; 364/521
[58] Field of Search .............. 340/724, 726, 727, 995; 364/424.01, 424.02, 449, 518, 521

[56] References Cited

U.S. PATENT DOCUMENTS

| | | | |
|---|---|---|---|
| 4,360,876 | 11/1982 | Girault et al. ............... | 340/995 X |
| 4,527,155 | 7/1985 | Yamaki et al. ............... | 340/995 X |
| 4,638,438 | 1/1987 | Endo et al. .................. | 340/995 X |
| 4,646,089 | 2/1987 | Takanabe et al. ............ | 364/449 X |
| 4,716,404 | 12/1987 | Tabata et al. ................ | 340/995 X |
| 4,737,927 | 4/1988 | Hanabusa et al. ........... | 340/995 X |
| 4,761,742 | 8/1988 | Hanabusa et al. ........... | 340/995 X |
| 4,812,980 | 3/1989 | Yamada et al. .............. | 340/995 X |

FOREIGN PATENT DOCUMENTS 3405125 8/1984 Fed. Rep. of Germany .
2032740 5/1980 United Kingdom .

OTHER PUBLICATIONS

"Map Storage on CD-ROM", D. F. Cook, BYTE, Jul. 1987, vol. 12, No. 8.

*Primary Examiner*—Parshotam S. Lall
*Assistant Examiner*—Edward R. Cosimano
*Attorney, Agent, or Firm*—Anne E. Barschall

[57] ABSTRACT

A vehicle navigation device including a control unit, storage memory, reproduction unit and map element selector. Road map data is stored in the storage memory. The map element selector selects elements from the road map data. The reproduction unit includes a picture memory and a display screen. The control unit includes a picture composition unit for loading a road map selected from the road map data into the picture memory. The road map represents an area around a selected map element. The picture composition unit also loads a name, generated for the selected map element by the character generator, into a predetermined segment of the picture memory. The picture composition unit also superposes a pattern of data which represents the selected map element. The pattern is displayed according to a predetermined representation standard and is superposed either on the segment or on the generated name. The predetermined representation standard is distinct from standards used for displaying other map elements.

18 Claims, 3 Drawing Sheets

VEHICLE NAVIGATION DEVICE WITH REPRODUCTION OF A SELECTED MAP ELEMENT ACCORDING TO A PREDETERMINED REPRESENTATION STANDARD

BACKGROUND OF THE INVENTION

The invention relates to a vehicle navigation device, comprising a bus whereto there are connected a control unit, a storage memory in which road map data is stored, a reproduction unit and a map element selector which is suitable for selecting map elements from the road map data. The reproduction unit comprises a picture memory, a data input of which is connected to the storage memory and to a character generator. A data output of the picture memory being connected, via a colour look-up table memory, to a display screen on which road maps to be selected can be displayed in colour. The control unit comprises a picture composition unit which is suitable for loading a road map selected from the road map data into the picture memory. The road map represents an area around a map element to be selected. The picture composition unit is also for loading a name, generated for the selected map element by the character generator, into a predetermined segment of said picture memory.

A vehicle navigation device of this kind is known from AFIPS Conference Proceedings, 1984 National Computer Conference, 9-12 July 1984, Las Vegas, Nev.; AFIPS Press (Reston, US), M. Sugie et al.: "CAR Guide on-board computer for automobile route guidance", pages 695-706. The known vehicle navigation device comprises a reproduction unit with a display screen on which a road map can be displayed. The road map displayed is formed by the picture composition unit, under the control of the control unit, on the basis of the map data stored in the storage memory in order to display the position and the progress of the vehicle through the road network. The road map is displayed in colour in a first part of the picture. A second part of the picture includes written information on the map displayed in the first part. To this end, the picture memory comprises separate sections for forming the picture to be displayed. Using a map element selector, map elements can be selected from the road map stored. The selected map element with its name and its environment are displayed on the display screen.

It is a drawback of the known device that the relationship between a map element and its name is only apparent from the predetermined location of said name (i.c. at the lower left of the display).

SUMMARY OF THE INVENTION

It is the object of the invention to realize a vehicle navigation device in which the relationship between the selected map element on the road map and its name is recognized at a glance.

To achieve this, a vehicle naviagation device in accordance with the invention is characterized in that the picture composition unit is also suitable for superposing a pattern, for display according to a predetermined representation standard, on that data which represents the selected map element, and for superposing said pattern on either said segment or the generated name, which predetermined representation standard is distinct from the standards used for displaying the other map elements. Due to the superposition of a pattern on the relevant map element as well as on its name or the background thereof, which pattern ensures that the selected map element is displayed in the road map according to a predetermined representation standard which is not used for any further map element, the relationship between the selected map element and its name is evident at a glance.

A preferred embodiment of a vehicle navigation device in accordance with the invention is characterized in that said pattern contains a colour code for display in a predetermined colour. Because the road map is displayed in colours, the use of a predetermined colour results in a simple and effective realization of the invention.

A further embodiment of a vehicle navigation device in accordance with the invention is characterized in that said colour code designates contrasting colours for the display of said segment and said name. This realizes a better legibility.

Said colour code may be, for instance, the colour code for display in the colour light-yellow.

In another embodiment, said segment extends in a part of the picture memory which is nearby the selected map element. As a result, the relationship between the map element and its name becomes even more evident.

In another embodiment in accordance with the invention said segment is located to the right of the corresponding selected map element, and can be moved by a user via an interface with respect to the map element. This is useful if the user would like to have a look at the part of the road map masked by the segment.

Preferably, the picture composition unit is suitable for loading data into said segment, the set-up being such that the contents of said segment is surrounded by a box when displayed on the display screen. The introduction of a box offers a clear distinction between the various parts of the picture.

BRIEF DESCRIPTION OF THE DRAWING

The invention will be described in detail hereinafter with reference to the drawing; therein:

FIG. 3-b shows the same road map as shown in FIG. 3-a, be it with the selected map element as displayed when use is made of the invention.

DETAILED DESCRIPTION OF THE PREFERRED EMBODIMENTS

Figure 1:
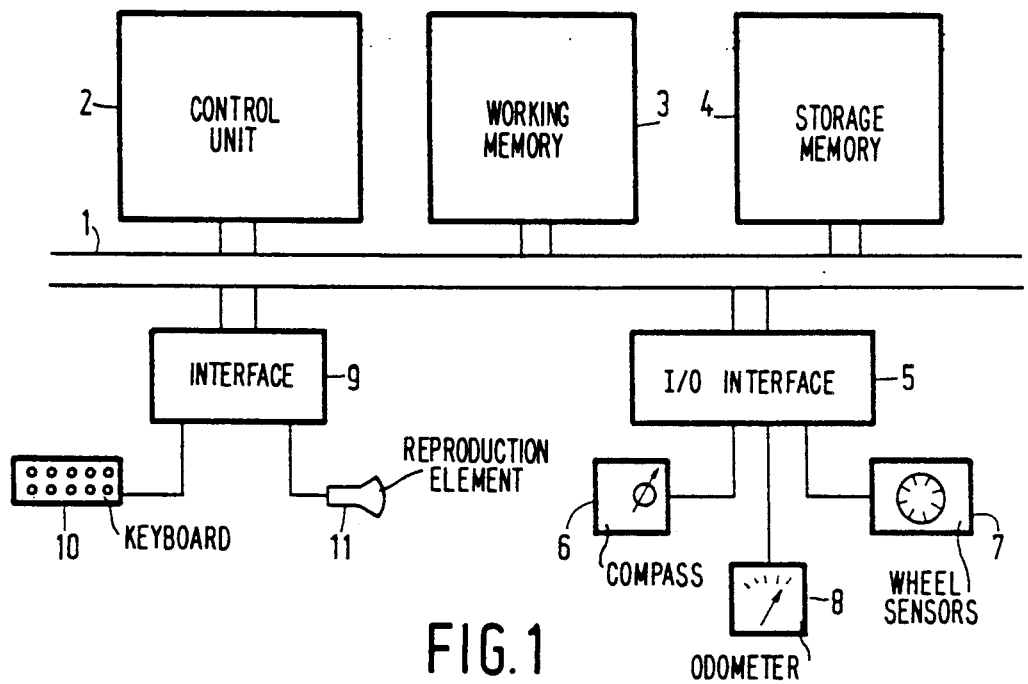
FIG. 1 shows the major components of an embodiment of a vehicle navigation device.

FIG. 1 shows the major components of an embodiment of a vehicle navigation device. The device comprises a bus 1 whereto there are connected a control unit 2, for example a microprocessor, a working memory 3 and a storage memory 4. The storage memory is formed, for example, by an optical disc and an associated read member. Road map data, navigation data and other control data are stored in the storage memory. The map data is stored in the memory 4 in the form of tables, for example as described in the article "Map storage on CD-ROM", by D. F. Cook, published in BYTE, July 1987, Vol. 12, No. 8. A first input/output interface 5 and a second input/output interface 9 are also connected to the bus 1. For example, an electromagnetic compass 6, wheel sensors 7 and an odometer 8 are connected to the first interface 5. The elements 6, 7, 8 all serve to pick up data in order to enable determination of the position of the vehicle. The determination of a vehicle position by means of a navigation system is described, for example in the article "EVA-Ortungs- und Navigationssystem für Landfahrzeuge" by E. P. Neukirchner, O. Pilsak and D. Schlögl, published in Nachrichtenzeitschrift Bd-36 (1983), Heft 4, pp. 214–218. A keyboard 10 and a reproduction element 11 are connected to the second input/output interface. The keyboard 10 is used inter alia for entering a starting point and a destination for the device and also for the selection of further map elements. The reproduction element 11 is formed, for example by a display screen in combination with a loudspeaker. On the display screen there is displayed inter alia a road map on which the position and progress of the vehicle through the road network is shown. Further details as to how a determined vehicle position and the progress of the vehicle are displayed on the display screen are given, for example in PCT Patent Application No. WO 86/02764.

Figure 2:
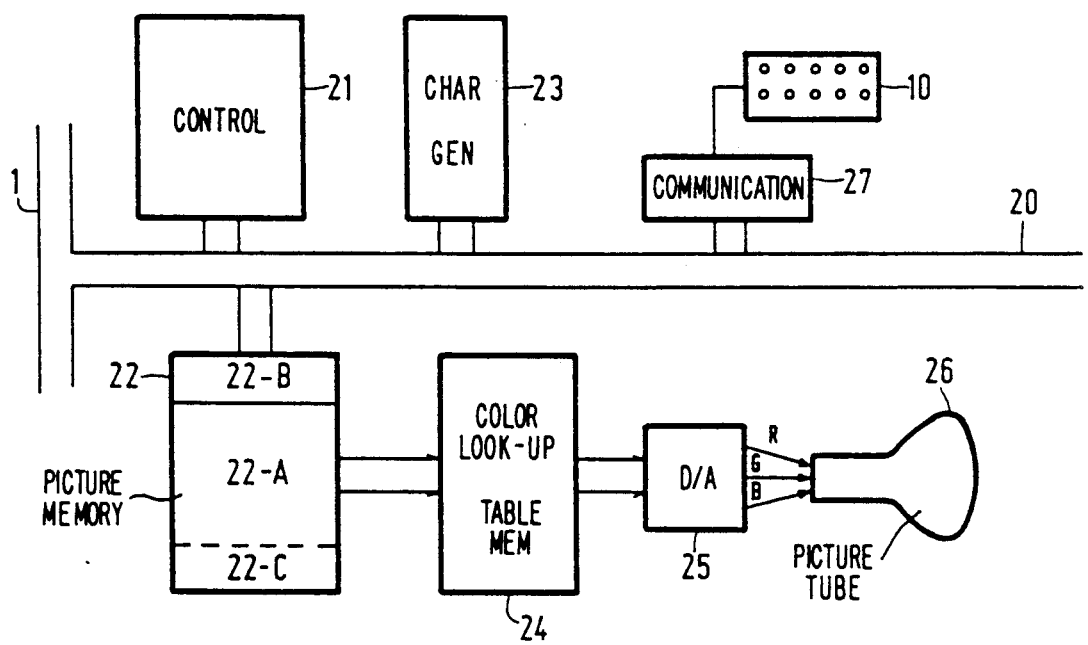
FIG. 2 is a more detailed representation of the construction of an input/output interface and the communication members connected thereto.

FIG. 2 shows a more detailed construction of the second input/output interface and the communication members connected thereto. The input/output interface comprises a further bus 20 which is connected to the bus 1. To the further bus there are connected a control member 21, for example a microprocessor, and a picture memory 22, a character generator 23 and a communication module 27. The picture memory 22 has first and second parts 22-A and 22-B, for storing the first and second parts A-1 and A-2 of the picture, respectively. The keyboard 10 is connected to the communication module 27 which provides the communication between the keyboard 10 and the other members. A data output of the picture memory 22 is connected to an address input of a colour look-up table memory 24 in which colour words are stored in order to display the information stored in the picture memory in colour on the picture tube 26. The contents and the operation of such a colour look-up table memory are described, for example in British Patent Application No. 2 032 740. Between the data output of the colour look-up table memory and the picture tube there is connected a digital-to-analog converter 25 which converts the digital colour words from the colour look-up table memory into control signals for the red, the green and the blue electron gun of the picture tube.

Figure 3A:
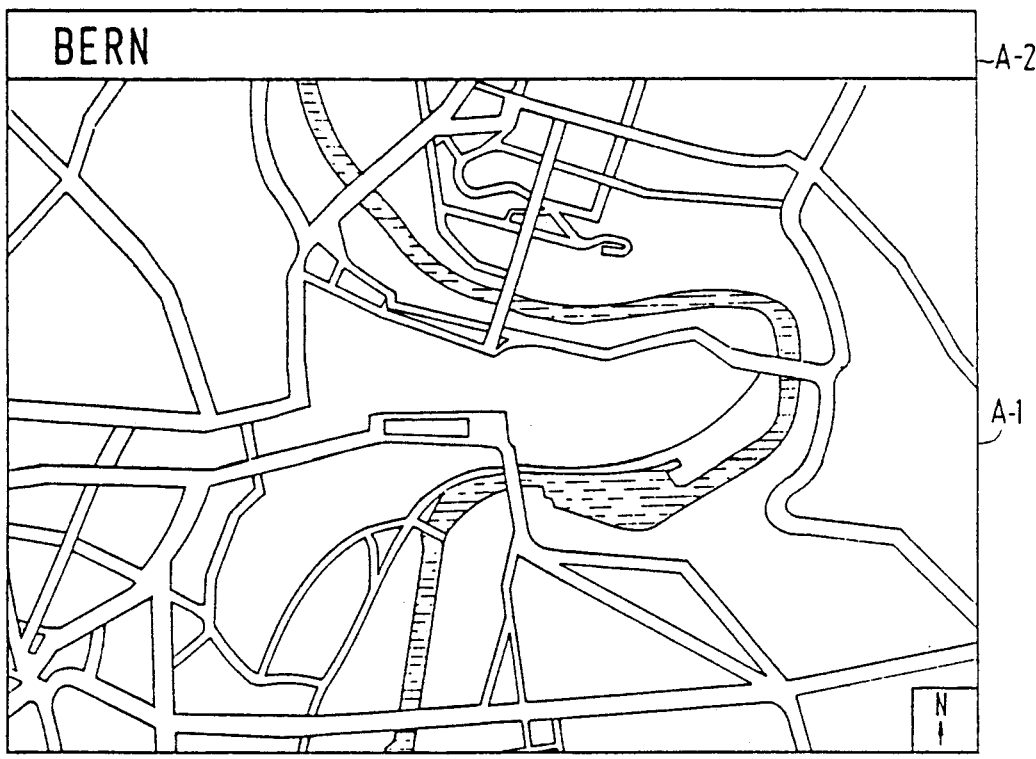
FIG. 3-a shows an example of a road map as displayed on the display screen of the device.
Figure 3B:
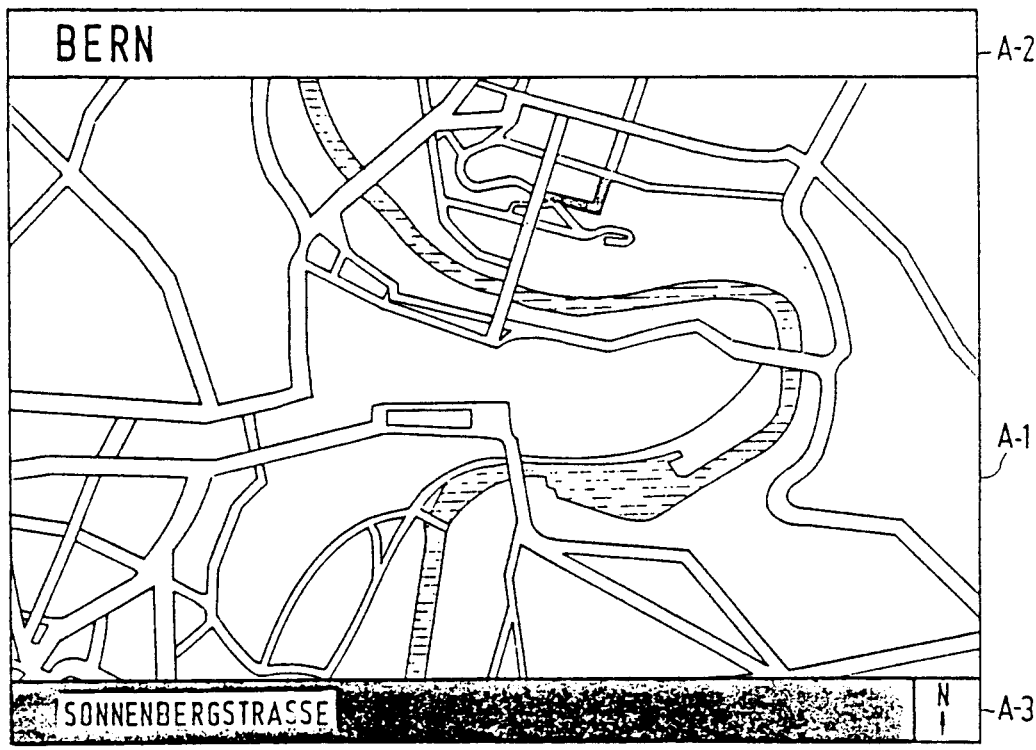

FIG. 3-a shows an example of a picture such as displayed on the picture tube 26 of the reproduction element. The black-and-white picture shown in FIG. 3-a is actually a colour picture. The picture shown is subdivided into two non-overlapping parts. In a first part (A-1) a road map is displayed. The second part (A-2) is formed by a title bar in which information on the road map displayed in the first part is included. In the present example the road map shown is formed by the map of a city, in this case the city of BERN, and the name of the city is displayed in the title bar (part A-2). Other information which can be displayed in the title bar is, for example "musea", "restaurants", "post offices". The indication in the title bar is preferably displayed on a background colour, for example light-grey, in order to improve discrimination in the display. Furthermore, for each theme a given colour can be selected for the letters forming the information. For example, the name of the city is displayed in black letters and the indication "musea" in purple letters. This also makes a contribution to the discrimination in the display.

FIG. 3-b shows substantially the same road map as shown in FIG. 3-a; however, at the lower side of the picture there is provided a further bar (A-3) in which an indication is given of a map element which forms part of the road map displayed in the first part. In the example shown in FIG. 3-b, a street name is displayed in the further bar, in this case Sonnebergstrasse. In order to display the map element given in the further bar in a very distinct manner, the relevant map element as well as its name or the background thereof is displayed according to a given representation standard, which representation standard is used exclusively for the display of the relevant map element and not for any other map element. Such a predetermined representation standard is formed, for example by a predetermined colour which is not used for the display of other map elements, or by the introduction of a shading across or a contour around the relevant map element. Because the predetermined representation standard is used only for the display of the relevant map element and its name or the background thereof, the relevant map element will be clearly distinct from the other map elements displayed and the relationship with its name is evident. Thus, in the present example the Sonnebergstrasse is displayed according to said predetermined representation standard for which a shading is chosen in the Figure. Preferably, however, a colour is chosen for said predetermined representation standard (this colour, however, cannot be shown in the FIG. 3-b). The colour light-yellow may be chosen. When the selected map element were situated in an environment having a mainly yellow colour, for example in a desert, another colour, for example light-green, would be selected for the display of the selected map element.

In FIG. 3-b, the shading used for the display of the map element in the first part is also used at the bottom of the picture as a background in the further bar. Preferably, said further bar is enclosed in a box in order to make the separation from the first part more distinct. A further possibility of displaying the name of the selected map element in said further bar consists, for example in the use of a contrasting colour of the background colour for the name.

The display according to the predetermined representation standard of a map element in the first part and the associated name in the further bar is initialized under the control of a user. The user can request a given map element, for example the name of a street, the location of the post office or a hotel in the vicinity. To this end, the user makes his wish known to the device either by means of the keyboard or, when the display screen comprises position detection means, by indicating a position on the display screen. The keyboard or the position detection means, in cooperation with the picture displayed, thus form a map element selector whereby the user selects a map element.

Figure 4:
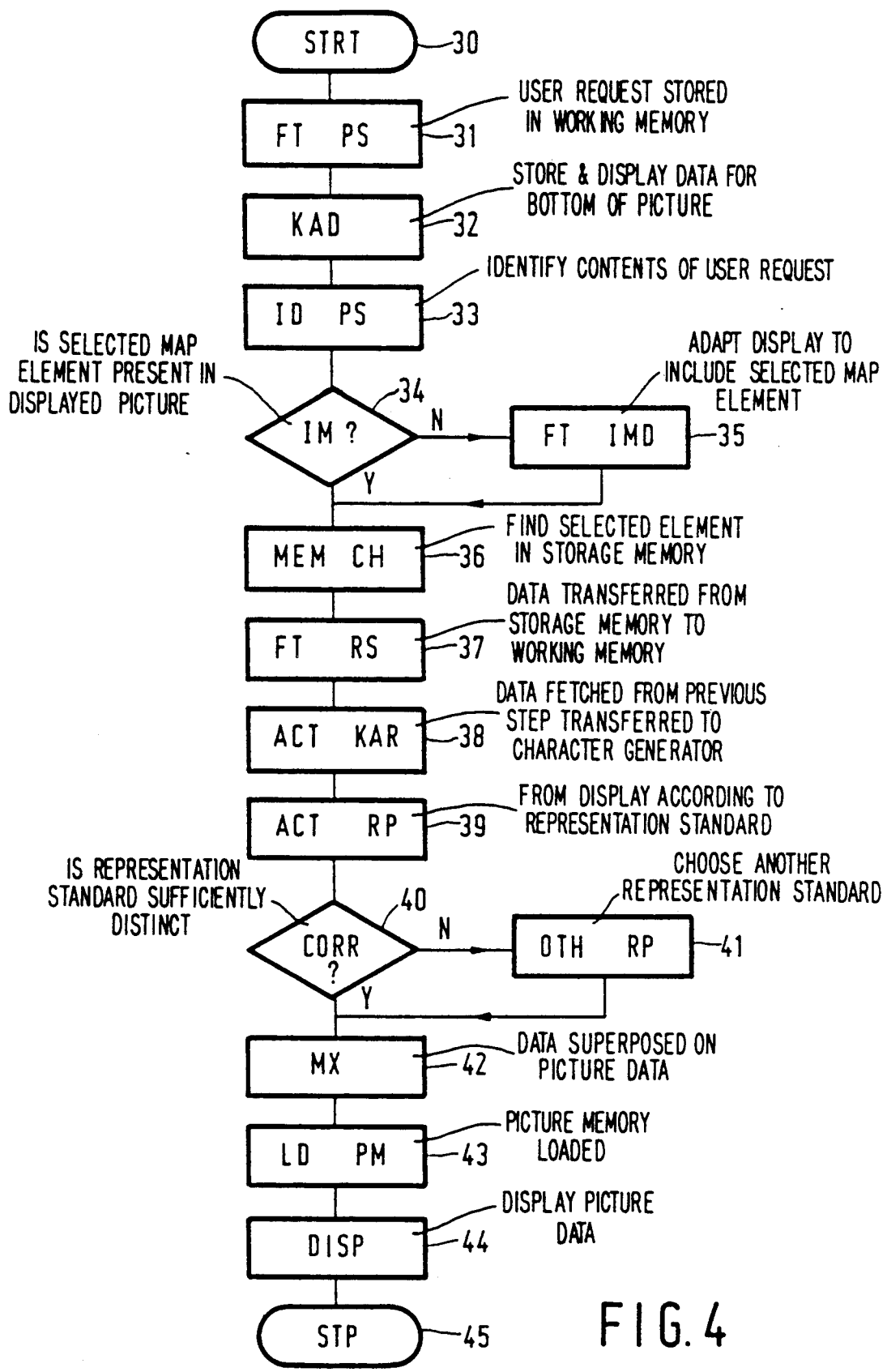
FIG. 4 shows a flowchart representing an example of a picture-forming program.

The formation of such a picture will now be described with reference to the flowchart of the picture-forming program shown in FIG. 4. The various steps in said flowchart are executed under the control of the control unit 21 (FIG. 2). To this end, the control unit 21 controls the elements 20, 23, 24, 25 and 26 which form a reproduction unit in conjunction with the control unit. As has already been stated, the picture-forming program is started (30) after the selection of a map element by a user. The various steps of the picture-forming program will now be described.

31 FT PS: The request as formulated by the user or the device is stored in a working memory of the control unit 21. When the request is formulated, for example by means of the keyboard, the request entered is transferred to the working memory via the communication module 27. When the request is formulated by touching a position on the display screen, the coordinates of the point touched are stored in the working memory.

32 KAD: Data is loaded into a predetermined segment (22-C) of the first part (22-A) of the picture memory in order to display a box at the bottom of the picture, which box forms the further bar. This box is subsequently displayed on the display screen in order to confirm a map element selection.

33 ID PS: This is an identification of the request where the control unit identifies the contents of the request. When the request was formulated by means of the keyboard, the control unit checks which map element (street name, museum, etc.) was entered. When position-determining means are used, the control unit checks the information which was displayed at the indicated position in order to identify the indicated map element.

34 IM?: During this step it is checked whether the selected map element is indeed present in the picture displayed. This is because the selected map element may be situated in the predetermined segment 22-c, in which case it would be overwritten by the further bar; it may also be that the map element selected by the keyboard is not situated within the picture displayed. Upon a negative result of step 34, control passes to box 36 via box 35. Upon a positive result of step 34, control passes directly to box 36.

35 FT IMD: When the selected map element is not situated in the picture displayed, the contents of the picture memory (part 22-A) is adapted so that the selected map element is indeed situated in the picture.

36 MEM CH: On the basis of the data indentified during the previous step, from the data of the storage memory the data is searched which is necessary for granting the formulated request. The search from the data of the storage memory is known per se. As is described in the cited article "Map Storage on CD-ROM", the storage memory contains street names and other map elements which can be fetched in a known manner.

37 FT RS: When the necessary data has been found among the memory data (for example, street names, locations and names of musea, etc.), this data is transferred to the working memory.

38 ACT KAR: The character generator 23 is activated in order to display the map element indication for the selected map element in the further bar of the picture. To this end, the character generator receives data from the data fetched during the previous step.

39 ACT RP: The pattern providing the display according to the predetermined representation standard is formed. When the predetermined representation standard consists of a colour code, the colour code is then fetched, for example from an appropriate memory location in the control unit.

40 CORR?: During this step it is checked whether the predetermined representation standard is sufficiently distinct from the representation of the environment of the selected map element. For example, when the colour light-yellow was chosen as the predetermined representation standard, it is checked whether the colour yellow has not been used for map elements displayed in the vicinity of the selected map element. It will be evident that, when yellow is not used for the normal display of map elements, this step can be omitted like the step 41. Upon a negative result of step 40, control passes to box 42 via box 41. Upon a positive result of step 40, control passes directly to box 42.

41 OTH RP: If insufficient distinction is found in the step 40, another representation standard is chosen, for example light-green if yellow has already been used.

42 MX: This pattern is superposed on the picture data for the map element selected by the request, and also on the data from the character generator in order to compose the picture to be displayed.

43 LD PM: The picture memory 22 is loaded, the picture data (character+colour code) for the further bar being loaded into the part 22-C, the picture data for the map data, including the colour code for the relevant map element, being loaded into the part 22-A; the title bar is loaded into the part 22-A.

44 DISP: The contents of the picture memory is transferred, via the colour look-up table memory 24 and the converter 25, to the picture tube 26 for presentation.

45 STP: This is the end of the program.

What is claimed is:

1. A vehicle navigation device comprising:
    (a) a storage memory for storing road map data;
    (b) a character generator;
    (c) a reproduction unit having:
        (i) a picture memory; and
        (ii) a display screen for displaying maps in color and having an input coupled with the picture memory;
    (d) a map element selector for selecting map elements from the road map data;
    (e) a control unit, including a picture composition unit for:
        (i) loading a road map selected from the road map data into the picture memory, in response to the map element selector, which selected road map represents an area around a selected map element;
        (ii) loading a name, generated for the selected map element by the character generator, into a predetermined segment of the picture memory;
        (iii) superposing a pattern, within at least one first shape which corresponds to a shape of the selected map element, for display according to a predetermined representation standard, on data which represents the selected map element, which predetermined representation standard is distinct from standards used for displaying other map elements; and
        (iv) superposing the pattern, within at least one second shape which corresponds to a shape of either the segment or the generated name, for display according to the predetermined representation standard, on data which represents either the segment or the generated name.

2. A vehicle navigation device as claimed in claim 1 wherein the picture composition unit is suitable for loading data into said segment, the set-up being such that the contents of said segment is surrounded by a box when displayed on the display screen.

3. A vehicle navigation device as claimed in claim 1 wherein said segment extends in a part of the picture memory which is nearby the selected map element.

4. A vehicle navigation device as claimed in claim 3, wherein the picture composition unit is suitable for loading data into said segment, the set-up being such that the contents of said segment is surrounded by a box when displayed on the display screen.

5. A vehicle navigation device as claimed in claim 3, wherein said segment is located below the corresponding selected map element, and can be moved with respect to the map element by a user via an interface.

6. A vehicle navigation device as claimed in claim 5, wherein the picture composition unit is suitable for loading data into said segment, the set-up being such that the contents of said segment is surrounded by a box when displayed on the display screen.

7. A vehicle navigation device as claimed in claim 1, wherein said pattern contains a colour code for causing said pattern to be displayed in a predetermined distinctive colour, whereby the distinctive color causes the selected map element to be readily distinguishable from other map elements.

8. A vehicle navigation device as claimed in claim 7, wherein the picture composition unit is suitable for loading data into said segment, the set-up being such that the contents of said segment is surrounded by a box when displayed on the display screen.

9. A vehicle navigation device as claimed in claim 7, wherein said segment extends in a part of the picture memory which is nearby the selected map element.

10. A vehicle navigation device as claimed in claim 9, wherein the picture composition unit is suitable for loading data into said segment, the set-up being such that the contents of said segment is surrounded by a box when displayed on the display screen.

11. A vehicle navigation device as claimed in claim 7, wherein said colour code designates contrasting colours for the display of said segment and said name.

12. A vehicle navigation device as claimed in claim 11, wherein the picture composition unit is suitable for loading data into said segment, the set-up being such that the contents of said segment is surrounded by a box when displayed on the display screen.

13. A vehicle navigation device as claimed in claim 11, wherein said segment extends in a part of the picture memory which is nearby the selected map element.

14. A vehicle navigation device as claimed in claim 13, wherein the picture composition unit is suitable for loading data into said segment, the set-up being such that the contents of said segment is surrounded by a box when displayed on the display screen.

15. A vehicle navigation device as claimed in claim 7, wherein said colour code is the colour code for display in the colour light-yellow.

16. A vehicle navigation device as claimed in claim 15, wherein the picture composition unit is suitable for loading data into said segment, the set-up being such that the contents of said segment is surrounded by a box when displayed on the display screen.

17. A vehicle navigation device as claimed in claim 15, wherein said segment extends in a part of the picture memory which is nearby the selected map element.

18. A vehicle navigation device as claimed in claim 17, wherein the picture composition unit is suitable for loading data into said segment, the set-up being such that the contents of said segment is surrounded by a box when displayed on the display screen.

* * * * *